United States Patent [19]

Ellis

[11] 4,357,796
[45] Nov. 9, 1982

[54] SMALL GAS TURBOFAN ENGINE WITH REGENERATING DIFFUSER

[75] Inventor: Stanley H. Ellis, Palm Beach Gardens, Fla.

[73] Assignee: The United States of America as represented by the Secretary of the Air Force, Washington, D.C.

[21] Appl. No.: 192,163

[22] Filed: Sep. 30, 1980

[51] Int. Cl.³ .................... F02K 3/068; F02C 7/10
[52] U.S. Cl. ................... 60/262; 60/39.51 R; 60/269
[58] Field of Search ............ 60/262, 226 R, 39.51 R, 60/269, 726

[56] References Cited

U.S. PATENT DOCUMENTS

| | | | |
|---|---|---|---|
| 2,397,999 | 4/1946 | Goddard | 60/226 |
| 2,476,179 | 7/1949 | Cameron | 60/39.51 R |
| 2,601,194 | 6/1952 | Whittle | 60/262 |
| 2,625,012 | 1/1953 | Larrecq | 60/39.51 R |
| 2,709,893 | 6/1955 | Birmann | 60/39.51 R |

FOREIGN PATENT DOCUMENTS 610939 10/1948 United Kingdom ........... 60/39.51 R

Primary Examiner—Douglas Hart

Attorney, Agent, or Firm—Donald J. Singer; Jacob N. Erlich

[57] ABSTRACT

A mixed flow, high bypass, gas turbofan engine that is small and compact, and that develops a thrust in the range of approximately 200–300 pounds. The engine has an axial length of approximately 18 inches, an air inlet of approximately 10 inches in diameter, and an exhaust nozzle of approximately 6 inches in diameter. To reduce engine length high pressure compressor diameter, a high pressure compressor is positioned in a location that is displaced from and is preferably parallel to the engine axis (i.e., centerline), a burner (i.e., combustion chamber) is similarly positioned on the other side of the engine axis, only one turbine is used, and a unique flow path also is used. In addition, a heat exchanger of the regenerative type which includes a plurality of pipe diffusers is used, and it is positioned in the hot exhaust flow of the single turbine to pre-heat the compressor air prior to entry into the burner. Further, a gear shift may be used with the compressor to give better part-power performance. The small size, the thrust capability, and the good fuel consumption during part-power operation, make this engine ideal for use in air-launched cruise missiles.

10 Claims, 1 Drawing Figure

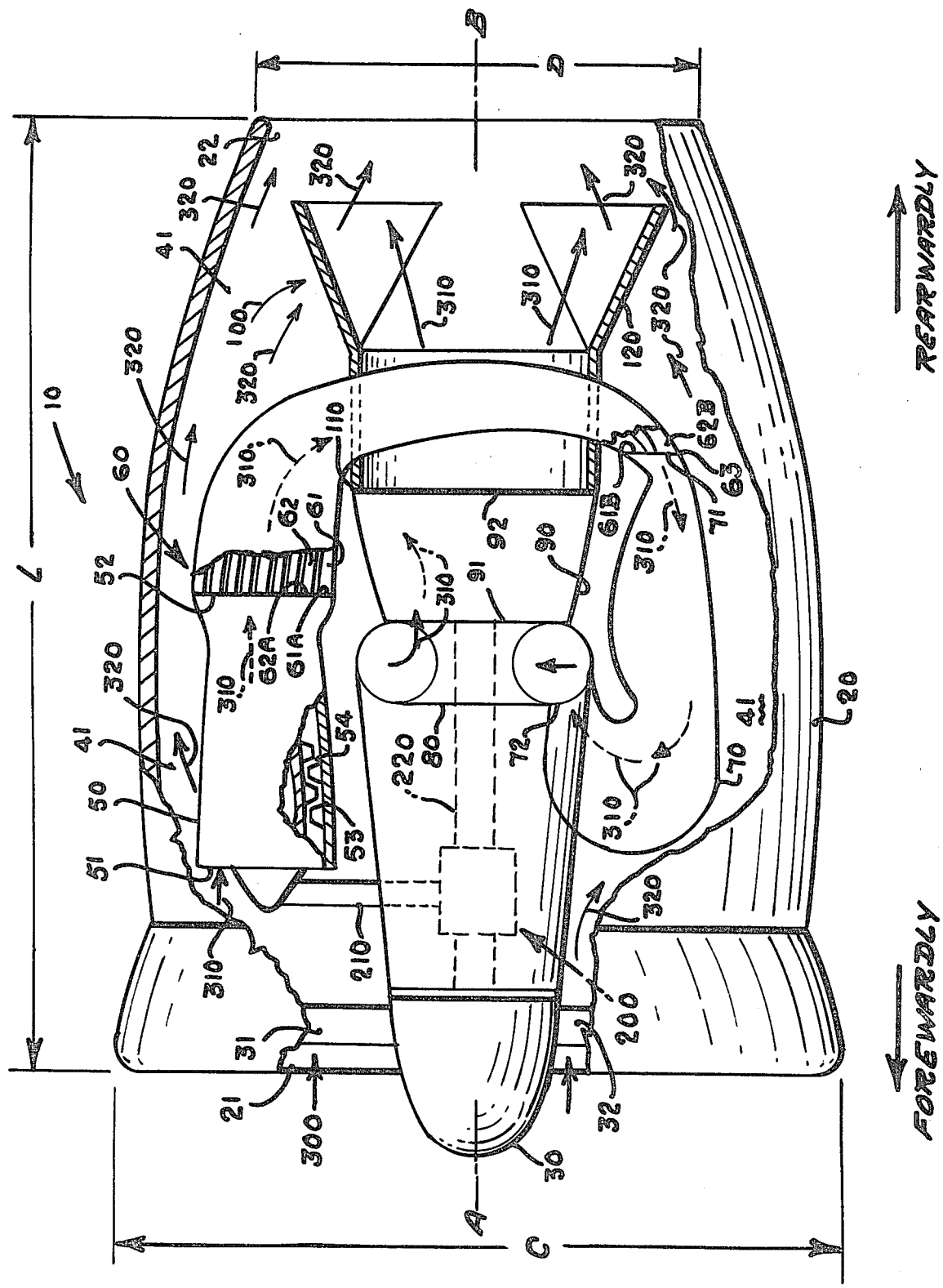

SMALL GAS TURBOFAN ENGINE WITH REGENERATING DIFFUSER

STATEMENT OF GOVERNMENT INTEREST

The invention described herein may be manufactured and used by or for the Government for governmental purposes without the payment of any royalty thereon.

BACKGROUND OF THE INVENTION

This invention relates to a small (i.e., compact) gas turbofan engine and, more particularly, to such an engine which has a high bypass ratio and a regenerator.

With the advent of cruise missiles, small gas turbofan engines have been necessary. Although the conventional gas turbofan aircraft engine may vary from ten to twenty feet in axial length and from three to eight feet in diameter, a cruise missile gas turbofan engine should not exceed approximately two feet in axial length and approximately one foot in diameter. To those not skilled in the art, the obvious answer to attaining such a small gas turbofan engine would appear to miniaturize the components. Regretably, as is well known in the art, miniaturization of components is not the solution, because of cogent technological reasons, including the great difficulty in getting the low pressure shaft (of the turbine that is connected to the fan) through the center of the high pressure "spool" (i.e., the compressor, the burner, and the high pressure turbine). Additionally, with small gas turbofan engines, the prime requirement (other than size) is good fuel consumption during part-power (as distinguished from fuel-power) operation.

I have invented a unique small gas turbofan engine which not only meets size requirements, but also substantially reduces fuel consumption during part-power operation because of its high bypass ratio and its regenerator.

By this invention, I have significantly advanced the state-of-the-art.

SUMMARY OF THE INVENTION

This invention pertains to a unique gas turbofan engine which is small in size and which substantially reduces fuel consumption during part-power operation.

Accordingly, the principal object of this invention is to teach the structure of such an engine, as exemplified by a preferred embodiment thereof.

This object, as well as other objects, of this invention will become readily apparent after a consideration of the description of the invention, together with reference to the drawing.

DESCRIPTION OF THE DRAWING

The drawing is a side elevation view, in simplified schematic and pictorial form, partially fragmented and partially in cross section, of a preferred embodiment of the invention.

DESCRIPTION OF THE PREFERRED EMBODIMENT

With reference to the drawing, the preferred embodiment 10 of my inventive engine, which has a longitudinal axis A-B, comprises: an outer casing 20 encircling the axis A-B and disposed such that it (i.e., the casing) is positioned symmetrically around the axis A-B, with the casing 20 having a forwardly located inlet 21 and a rearwardly located exhaust nozzle 22; a fan 30 (with blades, such as representative ones 31 and 32) that is disposed in the air inlet 21, and that is positioned perpendicular to, and symmetrical with respect to, the axis A-B; a fan air duct 41 that is located internally of the outer casing 20 that leads from the fan 30 to the exhaust nozzle 22; a high pressure compressor 50 that is located internally of the outer casing 20, that is operatively connected to the fan 30 and turbine 90, that is disposed such that it is displaced from, and is preferably parallel (i.e., in parallel-spaced relationship) to, the axis A-B, that is concurrently positioned within the fan air duct 41 (e.g., compressor 50 is shown positioned in fan air duct 41), and that has an open, forwardly positioned, first end 51 and an open, rearwardly positioned, second end 52; a plurality 60 of pipe diffusers (which includes representative pipe diffusers 61 and 62) that is disposed internally of the outer casing 20, with each pipe diffuser having an open first end (such as 61A for pipe diffuser 61, and 62A for pipe diffuser 62) in communication with the open, rearwardly positioned, second end 52 of the compressor 50, and with each pipe diffuser having an open second end (such as 61B for pipe diffuser 61, and 62B for pipe diffuser 62), and also with all of the second ends of the respective pipe diffusers collectively terminating in a (common) pipe bundle, generally designated 63; a burner 70 (i.e., a combustion chamber) that is disposed internally of the outer casing 20, that is positioned offset from, and preferably parallel to, the axis A-B, that has an open, rearwardly facing, (inlet) first end 71 which is in communication with the pipe bundle 63 of the plurality 60 of pipe diffusers, and that has an open, rearwardly facing, (outlet) second end 72 which is disposed forwardly of the first end 71; a toroidally-shaped plenum chamber 80 that is in communication with the open second end 72 of the burner 70; a multiple-state turbine 90 that is disposed internally of the outer casing 20, that is operatively connected to the fan 30 and also to the compressor 50, and that has an open, forwardly facing, inlet first end 91 which is in communication with the toroidally-shaped plenum chamber, and that also has an open, rearwardly facing, outlet second end 92 across which are positioned the pipe diffusers (e.g., the plurality 60 of pipe diffusers) which, thereby, form a stationary heat exchanger of the regenerator type (i.e., a heat exchanger which transfers heat from the turbine exhaust gases to the combustion air leaving the compressor 50; and, a mixer assembly (generally designated 100) that is disposed internally of the outer casing 20, that is interposed between the multiple-state turbine 90 and the exhaust nozzle 22, that is operatively connected to the outlet second end 92 (i.e., the exhaust) of the turbine 90, and that is positioned in part in the fan air duct 41.

More specifically, the high pressure compressor 50 has axial flow front stages (such as representative ones 53 and 54) and may have a centrifugal flow rear stage (not shown).

As a matter of preference and not of limitation, the small gas turbofan engine 10 has an outer casing with an outer diameter C of approximately ten inches at the forwardly located air inlet 21, an outer diameter D of approximately six inches at the rearwardly located exhaust nozzle 22; and, an axial length L from the air inlet 21 to the exhaust nozzle 22 of approximately eighteen inches. Additionally, also as a matter of preference and not of limitation, the engine 10 has a (high) bypass ratio of approximately eight (i.e., 8-to-1), and a thrust which is in the range of between approximately two hundred pounds to approximately three hundred pounds.

The fan 30, compressor 50, and turbine 90 are operatively connected through gearbox means 200 which is interposed therebetween. The fan 30 is driven by turbine 90 through drive shaft 220 and gearbox 200. The compressor 50 is driven by the turbine 90 through drive shaft 220, gearbox 200 and power shaft 210.

Additionally, the gearbox means 200 can be used either to drive the fan 30 directly from the turbine 90 or reduce the speed of said fan 30 relative to turbine 90. A speed reduction between turbine 90 and fan 30 will permit the use of a smaller diameter, more efficient turbine having fewer stages.

Further, the gearbox means 200 also permits the selective transmission of speed from the turbine 90 to the compressor 50 in separate ratios for cruise and maximum thrust. More specifically, the selective transmission can be in two ratios: a low gear ratio for best cruise performance; and a high gear ratio for maximum thrust. Driving the compressor 50 at low speed during cruise results in a higher bypass ratio and consequently lower part power fuel consumption for the engine 10.

It is also to be noted that, except for sizing, configuration, and positioning, the following major components of my invention 10 are conventional and well known: the outer casing 20; the fan 30; the burner 70; the mixer assembly 100; and the gearbox means 200. For example, the mixer assembly 100 is of the type which has a forward cylindrical section 110 and a rearward convoluted section 120. Said mixer assembly 100 is secured to the outlet end 92 of turbine 90. Fan air flow 320 and turbine exhaust flow 310 intermix as they pass through the convoluted section 120 of mixer assembly 100.

It is further to be noted that each of the pipe diffusers (such as representative ones 61 and 62) of the plurality 60 are conical like-shaped, with a smaller diameter inlet (in communication with the compressor outlet 52) and a larger diameter outlet (in communication with the burner inlet 71).

MANNER OF OPERATION OF THE PREFERRED EMBODIMENT

The manner of operation of the preferred embodiment of my inventive engine 10 can be easily ascertained by any person of ordinary skill in the art from the foregoing description, coupled with reference to the contents of the drawing.

For others, the following simplified explanation is made.

As a preliminary matter, it is to be noted that, in a conventional gas turbofan engine, the compressor, the burner (i.e., combustion chamber), the turbine for the compressor, and the turbine for the fan are all axially aligned (i.e., aligned along the axis or the centerline of the engine); and, that the flow path is also axial. In my small gas turbofan engine there is only one turbine 90, not two; both the compressor 50 and the burner 70 are offset from the engine axis or centerline; there is a regenerator (formed by the plurality 60 of pipe diffusers, and the positioning of that plurality); and, the flow path is not axial.

With regard to the flow path in my engine 10, a description of the flow path will show the uniqueness of the flow path and of the structure of my engine 10, and it is as follows: the air 300 from the environment enters the air inlet 21 and the casing 20 and divides into fan air flow 320 and compressor air flow 310. The fan air 320 flows toward the exhaust nozzle 22. The compressor air 310 enters the high compressor 50, is compressed to a high pressure, and is exhausted into the plurality 60 of pipe diffusers, where it is pre-heated by the hot exhaust 310 (which originally was air from the compressor) from the turbine 90. The pre-heated air 310 enters the burner 70, where it is intermixed with fuel (not shown) and the mixture is burned. The burner exhaust flow 310 (which is part of the original compressor air flow) enters the turbine 90, drives it, and exhausts from it. The turbine exhaust flow 310, (which is part of the original compressor air flow) mixes with the fan airflow 320 in mixer assembly 100. Rearwardly of these members the flow 310 and the flow 320 intermix and exit from the nozzle 22.

CONCLUSION

It is abundantly clear from all of the foregoing, and from the contents of the drawing, that the stated desired principal object, as well as other related objects, of the invention 10 have been attained.

It is to be noted that, although there have been described and shown the fundamental and unique features of my invention 10 as applied to a preferred embodiment thereof, various other embodiments, variations, adaptations, substitutions, additions, omissions, and the like may occur to, and can be made by, those of ordinary skill in the art, without departing from the spirit of my invention.

What is claimed is:

1. A small gas turbofan engine having a longitudinal axis and comprising:
   a. an outer casing encircling said axis and disposed such that it is positioned symmetrically around said axis, with said casing having a forwardly located air inlet and a rearwardly located exhaust nozzle;
   b. a fan disposed in said air inlet, and positioned perpendicular to, and symmetrical with respect to, said axis;
   c. an annular fan air duct located internally of said outer casing and leading from said fan to said exhaust nozzle;
   d. a high pressure compressor located internally of said outer casing, operatively connected to said turbine, and disposed such that it is displaced from said axis and also is concurrently positioned within said fan air duct, with said high pressure compressor having an open, forwardly positioned, first end and an open, rearwardly positioned, second end;
   e. a plurality of pipe diffusers disposed internally of said outer casing, with each pipe diffuser having an open first end in communication with said open, rearwardly positioned, second end of said high pressure compressor, and with each pipe diffuser having an open second end, with all said second ends collectively terminating in a pipe bundle;
   f. a burner disposed internally of said outer casing, and positioned offset from said axis, with said burner having an open, rearwardly facing, first end in communication with said pipe bundle of said pipe diffusers, and with said burner having an open, rearwardly facing, second end disposed forwardly of said first end thereof;
   g. a toroidally-shaped plenum chamber in communication with said open second end of said burner;
   h. a multiple-stage turbine disposed internally of said outer casing, operatively connected to said fan and to said compressor, with said turbine having an open, forwardly facing, inlet first end in communication with said toroidally-shaped plenum chamber, and with said turbine also having an open, rearwardly facing, outlet second end across which are positioned said pipe diffusers which, thereby, form a stationary heat exchanger of the regenerator type;

i. and, a mixer assembly disposed internally of said outer casing, interposed between said multiple-stage turbine and said exhaust nozzle, operatively connected to said outlet second end of said multiple-stage turbine, and positioned in part in said fan air ducts.

2. A small gas turbofan engine, as set forth in claim 1, wherein said high pressure compressor has axial flow front stages and at least one centrifugal flow rear stage.

3. A small gas turbofan engine, as set forth in claim 1, wherein said outer casing has:
   a. an outer diameter of approximately ten inches at said forwardly located air inlet;
   b. an outer diameter of approximately six inches at said rearwardly located exhaust nozzle;
   c. and, a length from said air inlet to said exhaust nozzle of approximately eighteen inches.

4. A small gas turbofan engine, as set forth in claim 3, wherein said engine has:
   a. a bypass ratio of approximately eight;
   b. and, a thrust in the range of between from approximately two hundred pounds to approximately three hundred pounds.

5. A small gas turbofan engine, as set forth in claim 4, wherein said fan and said turbine are operatively connected such that said fan is driven directly by said turbine.

6. A small gas turbofan engine, as set forth in claim 4, wherein said engine further comprises a gearbox means, for transmitting speed and power from said turbine, to said fan and to said compressor, disposed internally of said outer casing, and operatively connected to said turbine, to said fan, and to said compressor.

7. A small gas turbofan engine, as set forth in claim 6, wherein said gearbox means reduces said speed from said turbine to said fan.

8. A small gas turbofan engine, as set forth in claim 6, wherein said gearbox means permits the selective transmission of speed and power from said turbine to said compressor in separate ratios for cruising speed efficiency and maximum thrust.

9. A turbofan engine comprising
   a hollow casing having a longitudinal axis, an inlet and an outlet,
   a fan disposed in said inlet for moving air through said casing, said fan having a longitudinal axis coincident with that of said casing,
   a compressor within said casing downstream of said fan, said compressor being oriented to receive a portion of the air directed through the casing by said fan and having a longitudinal axis displaced from that of said casing,
   a combustion chamber within said casing downstream of said fan and having a longitudinal axis displaced from that of said casing,
   a turbine downstream of said fan and having a longitudinal axis coincident therewith,
   means connecting said compressor and said turbine for transmission of rotary motion therebetween,
   means for directing output from said compressor to said combustion chamber, and
   means for directing output from said combustion chamber to said turbine.

10. A turbofan engine as defined in claim 9 wherein said penultimate mentioned means has a portion proximate to output from said turbine for preheating air input to said combustion chamber.

* * * * *